(12) United States Patent
Ng

(10) Patent No.: US 9,335,872 B2
(45) Date of Patent: May 10, 2016

(54) HYBRID STYLUS FOR USE IN TOUCH SCREEN APPLICATIONS

(71) Applicant: STMicroelectronics Asia Pacific Pte Ltd, Singapore (SG)

(72) Inventor: Chee Yu Ng, Singapore (SG)

(73) Assignee: STMICROELECTRONICS ASIA PACIFIC PTE LTD, Singapore (SG)

( * ) Notice: Subject to any disclaimer, the term of this patent is extended or adjusted under 35 U.S.C. 154(b) by 169 days.

(21) Appl. No.: 13/632,443

(22) Filed: Oct. 1, 2012

(65) Prior Publication Data

US 2014/0092054 A1 Apr. 3, 2014

(51) Int. Cl.
*G06F 3/044* (2006.01)
*G06F 3/0354* (2013.01)

(52) U.S. Cl.
CPC ............ *G06F 3/044* (2013.01); *G06F 3/03545* (2013.01)

(58) Field of Classification Search
CPC ... G06F 3/0488; G06F 3/04883; G06F 3/044; G06F 3/04886; G06F 3/045
USPC .................................................. 345/173–174
See application file for complete search history.

(56) References Cited

U.S. PATENT DOCUMENTS

| | | | |
|---|---|---|---|
| 5,290,972 A * | 3/1994 | Someya et al. ............ 178/19.04 |
| 5,438,275 A | 8/1995 | Fado et al. | |
| 5,571,997 A | 11/1996 | Gray et al. | |
| 7,136,052 B1 | 11/2006 | Lam | |
| 8,212,795 B2 | 7/2012 | Henry | |
| 8,558,250 B2 * | 10/2013 | Venugopal et al. ............. 257/88 |
| 8,976,127 B2 | 3/2015 | Han | |
| 2009/0153526 A1 | 6/2009 | Blake et al. | |
| 2010/0051356 A1 | 3/2010 | Stern et al. | |
| 2010/0053120 A1 | 3/2010 | Chang et al. | |
| 2010/0146457 A1 | 6/2010 | Thimbleby et al. | |
| 2010/0252335 A1 | 10/2010 | Orsley | |
| 2010/0321304 A1 * | 12/2010 | Rofougaran ............ G06F 3/046 345/173 |
| 2011/0055753 A1 | 3/2011 | Horodezky et al. | |
| 2011/0120359 A1 | 5/2011 | Sekine | |
| 2011/0304577 A1 | 12/2011 | Brown et al. | |
| 2012/0062521 A1 | 3/2012 | Ahn et al. | |
| 2012/0068964 A1 * | 3/2012 | Wright et al. ................. 345/174 |
| 2012/0092277 A1 | 4/2012 | Momchilov | |
| 2012/0105361 A1 | 5/2012 | Kremin et al. | |
| 2012/0113047 A1 | 5/2012 | Hanauer et al. | |
| 2012/0127110 A1 | 5/2012 | Amm et al. | |
| 2012/0139879 A1 | 6/2012 | Kim et al. | |
| 2012/0327041 A1 * | 12/2012 | Harley et al. .................. 345/179 |
| 2013/0002599 A1 | 1/2013 | Townsley et al. | |
| 2013/0033437 A1 | 2/2013 | Lee et al. | |
| 2013/0106722 A1 | 5/2013 | Shahparnia et al. | |
| 2013/0106741 A1 * | 5/2013 | Pedersen et al. ............... 345/173 |
| 2013/0194223 A1 | 8/2013 | Ward et al. | |
| 2013/0257793 A1 * | 10/2013 | Zeliff et al. .................... 345/174 |
| 2014/0043279 A1 * | 2/2014 | Pedersen et al. .............. 345/174 |

\* cited by examiner

*Primary Examiner* — Christopher E Leiby
(74) *Attorney, Agent, or Firm* — Gardere Wynne Sewell LLP

(57) ABSTRACT

A touch screen system is configured to sense a proximate or actual touch made to a touch screen panel. In response thereto, an RF transmitter is actuated to emit RF energy. A stylus receives the emitted RF energy and includes an RF energy harvesting circuit that powers an enable circuit. The enable circuit generates an enable signal. The stylus responds to the enable signal by performing a sensing operation. The information collected in the sensing operation is then communicated over an RF communications link back to the touch screen system. The sensing operation preferably is a pressure sensing operation for detecting an applied pressure at an end of the stylus resulting from contact with the touch screen panel.

27 Claims, 2 Drawing Sheets

HYBRID STYLUS FOR USE IN TOUCH SCREEN APPLICATIONS

TECHNICAL FIELD

The present invention relates to touch screen systems and, in particular, to a stylus for use in such touch screen systems.

BACKGROUND

Capacitive touch screens are well known in the art. FIG. 1 illustrates a basic block diagram of such a capacitive touch screen 10 which comprises a touch screen panel 12 formed to include a plurality of drive (or force) lines 14 extending in a first direction and a plurality of sense lines 16 extending in a second direction which is generally oriented perpendicular to the first direction. A sensing cell 18 is formed at each location where a drive line 14 crosses a sense line 16. In this regard, a mutual capacitance is formed at each sensing cell between the drive line 14 and sense line 16.

A drive circuit 20 is configured to sequentially apply a drive signal to each of the drive lines 14. A sensing circuit 22 is coupled to the sense lines 16 and is configured to sense the mutual capacitance at each of the sensing cells 18. In the case where a touch or proximate touch is made to the touch screen panel 12 by a user's finger (or other body part) or a stylus (for example, in the format of a pen), there is a change in the value of the mutual capacitance at one or more of the sensing cells 18. This change in capacitance is detected by the sensing circuit 22.

A processing circuit 24 receives the sensed capacitance information from the sensing circuit 22 and, with knowledge of the sequential application of the drive signals by the drive circuit 20, operates to interpret the sensed capacitance information to make a detection of a touch or proximate touch being made to the touch screen panel 12 based on the sensed change in capacitance.

In many instances, the use of a stylus, instead of a user's finger, provides an advantageous touch mechanism for touch screen applications. For example, the stylus will provide a smaller touch or proximate touch detection area than a user's finger, and thus provides for a more accurate (or focused) control over system operation.

Generally speaking, two types of stylus are used in capacitive touch screen systems. The first type is a passive stylus which is essentially a "small" or "pinpoint" finger. The advantages of such a passive stylus include minimal cost with enhanced touch screen sensitivity, as well as ease of replacement or substitution. A known disadvantage is the inability to detect pressure of the touch (or contact) made to the capacitive touch screen. The second type is an active stylus which advantageously presents enhanced touch screen sensitivity along with the ability to detect application pressure (contact). However, the active stylus is significantly more expensive, hard to replace, and is a product which consumes battery power in use.

Notwithstanding the drawbacks experienced with active stylus implementations, the consumer market is moving towards adoption of this technology in connection with many products that use capacitive touch screen systems (such as smart phones, tablet computers, and the like). Thus, there is a need in the art for an improved stylus of an active-type for use in capacitive touch screen applications. The embodiments disclosed herein provide such an improved stylus configuration with enhanced functionality along with an associated system including a touch screen and stylus in operational combination.

SUMMARY

In an embodiment, a system comprises: a touch screen system configured to sense a touch made to a touch screen panel; and a stylus configured to sense stylus contact pressure information associated with said actual touch and communicate the sensed stylus contact pressure information to said touch screen system.

In an embodiment, a system comprises: a touch screen system configured to make a touch sensing with respect to a touch screen panel; an RF transmitter configured to be actuated so as to emit RF energy in response to said touch sensing at the touch screen panel; and a stylus including an RF energy harvesting circuit configured to enable a sensing operation at the stylus in response to receipt of the emitted RF energy.

The sensing operation may comprise a pressure sensing operation relative to contact of the stylus on the touch screen panel.

The system is further operable to communicate the stylus sensed information, for example, pressure sensing information, over an RF communications link from the stylus to the touch screen system or other system, such as a host system.

In an embodiment, a method comprises: sensing a touch of a touch screen panel made by a stylus; sensing at the stylus contact pressure associated with said sensed touch; and communicating the sensed stylus contact pressure to said touch screen system.

In an embodiment, a method comprises: sensing a touch of a touch screen panel; emitting RF energy in response to a sensed touch made to the touch screen panel; and enabling a sensing operation at a stylus for the touch screen panel in response to receipt of the emitted RF energy.

In an embodiment, a stylus comprises: an antenna; an RF energy harvesting circuit coupled to the antenna and configured to generate power from RF energy received by the antenna; an enable circuit powered by the RF energy harvesting circuit to generate an enable signal; an RF transmitter coupled to the antenna; a pressure sensor configured to sense pressure at an end of the stylus resulting from contact with the touch screen system; and a processing unit coupled to the pressure sensor and RF transmitter, said processing unit configured responsive to the enable signal to cause RF transmission of sensed pressure information using the RF transmitter.

BRIEF DESCRIPTION OF THE DRAWINGS

For a better understanding of the embodiments, reference will now be made by way of example only to the accompanying figures in which.

DETAILED DESCRIPTION OF THE DRAWINGS

Figure 2:
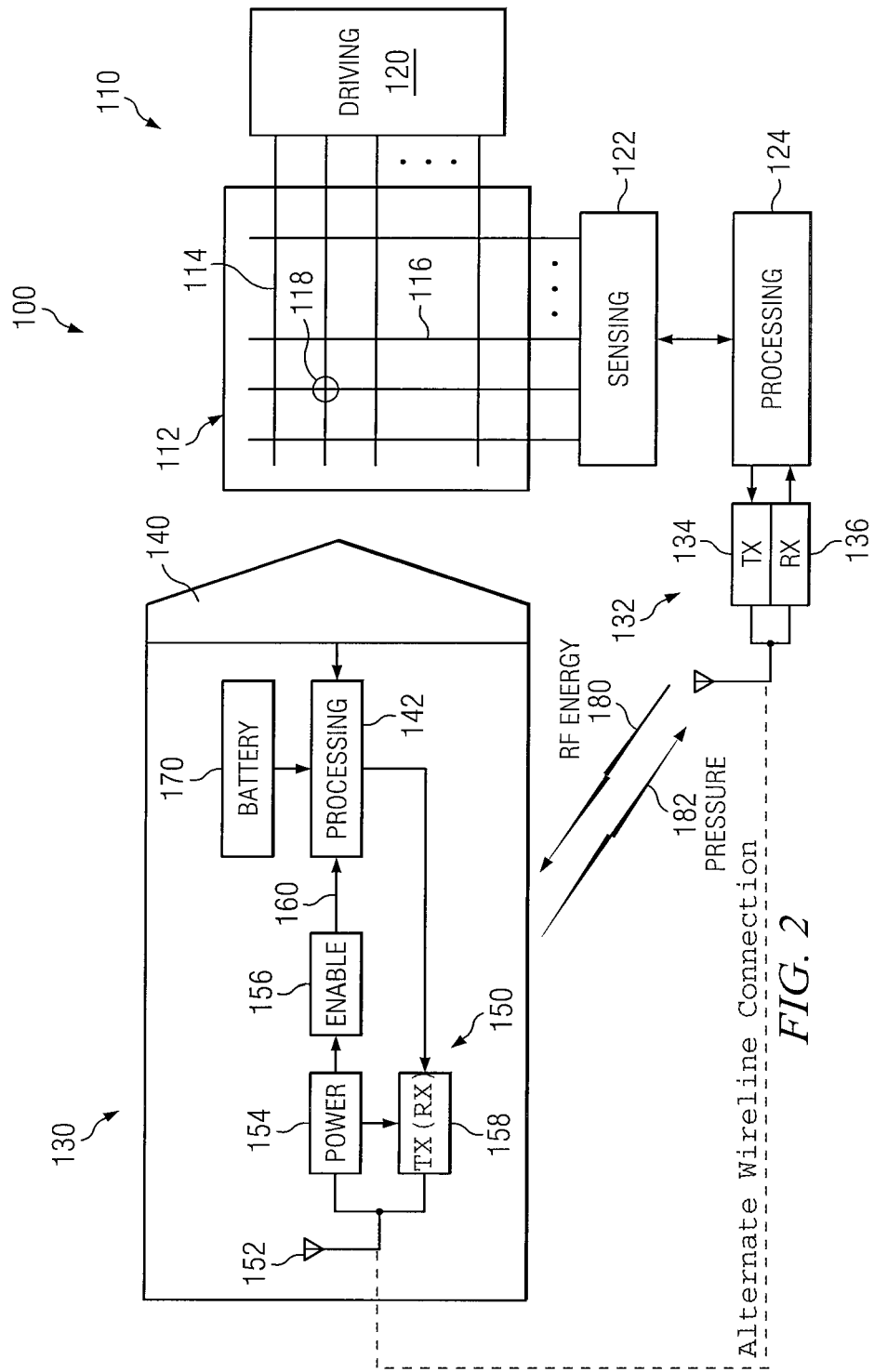
FIG. 2 is a block diagram of a system in accordance with an embodiment which includes a capacitive touch screen and an improved hybrid stylus.

Reference is now made to FIG. 2 wherein there is shown a block diagram of a system 100 in accordance with an embodiment which includes a capacitive touch screen 110 and a hybrid stylus 130. The capacitive touch screen 110 includes a touch screen panel 112 formed to include a plurality of drive (or force) lines 114 extending in a first direction and a plurality of sense lines 116 extending in a second direction which is generally oriented perpendicular to the first direction. A sensing cell 118 is formed at each location where a drive line 114 crosses a sense line 116. In this regard, a mutual capacitance is formed at each sensing cell between the drive line 114 and sense line 116.

A drive circuit 120 is configured to sequentially apply a drive signal to each of the drive lines 114. A sensing circuit 122 is coupled to the sense lines 116 and is configured to sense the mutual capacitance at each of the sensing cells 118. In the case where a touch or proximate touch is made to the touch screen panel 112 by a user's finger (or other body part) or the hybrid stylus 130, there is a change in the value of the mutual capacitance at one or more of the sensing cells 118. This change in capacitance is detected by the sensing circuit 122.

A processing circuit 124 receives the sensed capacitance information from the sensing circuit 122 and, with knowledge of the sequential application of the drive signals by the drive circuit 120, operates to interpret the sensed capacitance information to make a detection of a touch or proximate touch being made to the touch screen panel 112 based on the sensed change in capacitance.

The system 100 further includes a transceiver circuit 132 coupled to the processing circuit 124. The transceiver circuit 132 includes an RF transmitter (TX) 134 and an RF receiver (RX) 136. In response to the detection of a touch or proximate touch being made to the touch screen panel 112, the processing circuit 124 activates the RF transmitter 134 of the transceiver circuit 132 to emit RF energy 180.

The hybrid stylus 130 is provided in the format of a pen-like structure. At one end of the stylus is a pressure sensitive tip 140. It is with this pressure sensitive tip 140 that the user makes contact with the touch screen panel 112. The pressure sensitive tip 140 includes any suitable pressure transducer device operable to convert an applied physical pressure at the pressure sensitive tip 140 to an electrical signal having an analog or digital value indicative of that applied physical pressure.

In an implementation, the pressure sensitive tip 140 includes a silicon pressure sensor, for example, of the MEMS-type, known to those skilled in the art. However, it will be understood that any other pressure transducer device, including resistive, capacitive, inductive, reluctance, and the like devices, may be used for the pressure sensitive tip 140. When implemented as a silicon pressure sensor, the pressure sensitive tip 140 may comprise a sealed pressure chamber to which a diaphragm of the silicon pressure sensor is exposed. Contact with the pressure sensitive tip 140 causes a change in pressure within the sealed pressure chamber resulting in movement of the diaphragm, with diaphragm movement being sensed and converted to an electrical signal for transmission to the processing unit 142.

A processing unit 142 is provided within the hybrid stylus 130 and is coupled to receive the electrical signal output from the pressure sensitive tip 140 (i.e., the pressure data or information). Thus, the processing unit 142, through the pressure sensitive tip 140, is operable to detect an applied pressure of the hybrid stylus 130 to the touch screen panel 112.

The hybrid stylus 130 further includes a near field communication (NFC) system 150 comprised of an antenna 152, an energy harvesting circuit (Power) 154, an enable circuit 156 and a transmitter circuit 158. The near field communication system 150 is coupled to the processing unit 142.

As discussed above, processing circuit 124 activates the RF transmitter 134 of the transceiver circuit 132 to emit RF energy 180 in response to the detection of a touch or proximate touch being made to the touch screen panel 112. The emitted RF energy 180 is received by the near field communication system 150 through the antenna 152 with the energy harvesting circuit 154 functioning to generate a power supply signal applied to the enable circuit 156 and a transmitter circuit 158. The enable circuit 156 responds to the application of power from the energy harvesting circuit 154 by generating an enable signal 160 for application to the processing unit 142. In a preferred implementation, the enable signal 160 functions as a wake-up signal that will cause the processing unit 142 to wake from sleep mode. In another implementation, the enable signal 160 simply functions to enable processing unit 142 operation.

When awakened or enabled for operation, the processing unit 142 functions to detect an applied pressure of the hybrid stylus 130 to the touch screen panel 112 through the pressure sensitive tip 140 and communicate the sensed pressure (i.e., pressure data or information) through the transmitter circuit 158 using an RF communications link 182 to the RF receiver (RX) 136 of transceiver circuit 132. The sensed pressure information may then be communicated to the processing circuit 124 of the capacitive touch screen 110 and/or to any other circuitry or processing functionality for the system (such as a host processing functionality if implemented separate from the processing circuit 124). The pressure data or information may comprise in a basic implementation simply an indication of contact, and in a more complex implementation may comprise a value which is indicative of an amount of pressure associated with the contact.

In an implementation, the near field communication (NFC) system 150 of the hybrid stylus 130 may be configured in the manner of a passive RFID system well known to those skilled in the art and supplemented with an interface to the processing unit 142 for receiving the sensed pressure information. Alternatively, the processing unit typically contained within a passive RFID system may be used as the processing unit 142. In either case, appropriate programming or configuration of the processing unit 142 is made so as to effectuation the making of the pressure measurement and the communication of the pressure information over the RF communications link 182.

In a preferred implementation, the processing unit 142 and pressure sensitive tip 140 are powered from a battery power supply 170. When in sleep mode, the processing unit 142 draws very little power from the battery power supply 170, thus enabling the hybrid stylus 130 to have a prolonged battery life. In another implementation, the processing unit 142 and pressure sensitive tip 140 are powered from the energy harvesting circuit 154 of the near field communication (NFC) system 150, thus obviating the need for a battery power supply.

Figure 1:
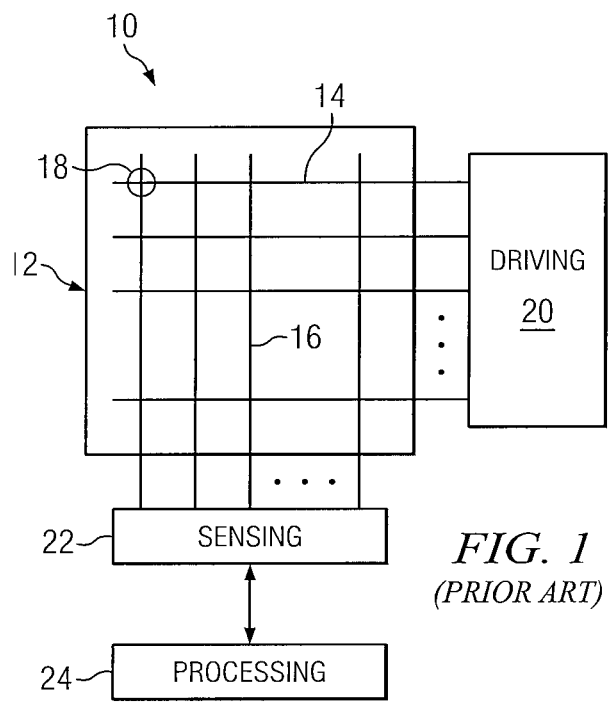
FIG. 1 is a block diagram of a prior art capacitive touch screen.
Figure 3:
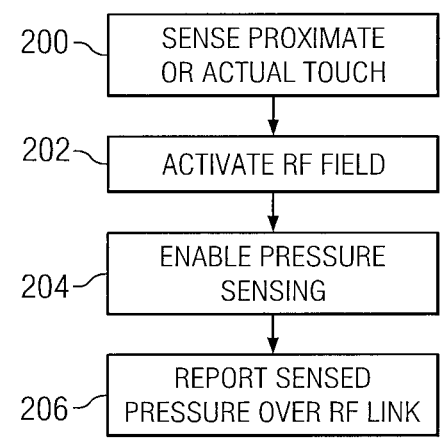
FIG. 3 is flow diagram for system operation.

Reference is now made to FIG. 3 which illustrates a flow diagram for system operation. In step 200, the capacitive touch screen (110) senses a proximate or actual touch of the touch screen panel (112) that is made by the hybrid stylus (130). It will be understood that a touch may be sensed by the panel (112) which is other than by the stylus, but such a detected touch will be distinguished from that of a stylus touch for purposes of the present operation. Thus, in a preferred implementation, the capacitive touch screen (110) distinguishes between a hybrid stylus (130) touch (proximate or actual) and any other touch (such as by a user's finger).

In step 202, the RF field is activated in response to the detected proximate or actual touch of the touch screen panel (112) that is made by the hybrid stylus (130). If the detected proximate or actual touch is from other than the hybrid stylus, the RF field is not activated. The RF field is provided by activation of the RF transmitter (134) of the transceiver circuit (132) to emit RF energy (180).

In step 204, hybrid stylus (130) senses the RF energy (180) and enables operation at the hybrid stylus to make a pressure sensing measurement with respect to the application of the tip of the hybrid stylus on the surface of the touch screen panel (112).

In step 206, the sensed pressure of stylus (130) tip application to the touch screen panel (112) is reported by an RF communication (182) made to the capacitive touch screen (110) (or host system for the capacitive touch screen).

It will further be understood that the reported sensed pressure of stylus (130) tip application to the touch screen panel (112) may be additionally used as a touch confirmation. In this regard, if a touch is detected in step 200, and the system does not receive a report associated with hybrid stylus action in step 206, the system will view the step 200 detected touch as being in error (i.e., a false touch).

In a preferred implementation, the stylus wirelessly communicates with the touch screen system. However, the system could instead be implemented in a wireline configuration (see, FIG. 2). In such a configuration, the transmitter 158 instead comprise a wireline transceiver (for example, of the USB or other suitable type) and the transceiver 132 would comprise a corresponding wireline device. The antennas would be replaced by a suitable wireline interconnection. With this configuration, the processing unit 124 would cause the transmitter 134 to send a control signal (for example, a wake up signal) over the wireline connection to the transceiver 158 of the stylus in response to a detected actual or proximate touch. The processing unit 142 would be enabled in response to the control signal to make the pressure sensing operation through sensor 140. The sensed pressure would then be communicated back over the wireline connection using the transceiver 158 and receiver 136. The battery 170 could provide power for all components of the stylus, or alternatively power supply could be provided over the wireline connection (such as is known with USB powered peripherals, for example).

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A system, comprising:
  a touch screen system comprising:
    a touch screen panel,
    a drive circuit configured to apply a drive signal to a plurality of drive lines of the touch screen panel,
    a sense circuit coupled to a plurality of sense lines to sense a touch made to the touch screen panel, and
    an RF transmitter configured to be actuated in response to the touch and initiate emission of an RF signal from an antenna in response to said sensed touch made to the touch screen panel, the RF signal emission being independent of any drive lines and sense lines of the touch screen panel; and
  a stylus including an RF energy harvesting circuit configured to enable sensing of stylus contact pressure information associated with said sensed touch in response to receipt of the emitted RF signal, the stylus also configured to communicate the sensed stylus contact pressure information to said touch screen system.

2. The system of claim 1, wherein the stylus includes a processing circuit, said processing circuit enabled by the RF energy harvesting circuit, said processing circuit further configured to cause an RF transmission of the sensed stylus contact pressure information.

3. The system of claim 2, wherein the stylus further comprises an RF transmitter configured to make an RF transmission of the sensed stylus contact pressure information and wherein the RF transmitter is powered by the RF energy harvesting circuit.

4. The system of claim 1, wherein the stylus further comprises an RF transmitter configured to make an RF transmission of the sensed stylus contact pressure information.

5. The system of claim 4, wherein the touch screen system further includes an RF receiver configured to receive the RF transmission of the sensed stylus contact pressure information from the stylus.

6. The system of claim 1, wherein the stylus includes a pressure sensor configured to sense contact pressure at an end of the stylus.

7. The system of claim 6, wherein the pressure sensor comprises a silicon pressure sensor.

8. The system of claim 7, wherein the silicon pressure sensor is of the MEMS-type.

9. The system of claim 1, wherein the touch screen panel is of a capacitive touch screen type.

10. A system, comprising:
  a touch screen system comprising:
    a touch screen panel,
    a drive circuit configured to apply a drive signal to a plurality of drive lines of the touch screen panel,
    a sense circuit coupled to a plurality of sense lines of the touch screen panel to make a touch sensing with respect to the touch screen panel, and
    an RF transmitter configured to be actuated in response to the touch and initiate emission of an RF signal in response to said touch sensing at the touch screen panel, the RF signal emission being independent of the plurality of drive lines and the plurality of sense lines; and
  a stylus including an RF energy harvesting circuit configured to enable a sensing operation at the stylus in response to receipt of the emitted RF signal.

11. The system of claim 10, wherein the stylus includes a pressure sensor configured to sense contact pressure at an end of the stylus, and wherein the sensing operation enabled by the RF energy harvesting circuit is a contact pressure sensing operation performed by said pressure sensor.

12. The system of claim 11, wherein the stylus includes a processing circuit, said processing circuit enabled by the RF energy harvesting circuit, said processing circuit further configured to cause an RF transmission of the sensed contact pressure.

13. The system of claim 12, further including an RF receiver configured to receive the RF transmission of the sensed contact pressure.

14. The system of claim 12, wherein the stylus further includes an RF transmitter coupled to the processing circuit and operable to transmit the sensed contact pressure over an RF communications link.

15. The system of claim 14, wherein the RF transmitter is powered by the RF energy harvesting circuit.

16. The system of claim 12, further including a battery contained within the stylus and configured to power the processing circuit.

17. The system of claim 16, further including an enable circuit powered by the RF energy harvesting circuit and configured to generate an enable signal, said processing circuit responsive to said enable signal to cause an RF transmission of the sensed contact pressure.

18. The system of claim 17, wherein the enable signal is a processing circuit wakeup signal.

19. The system of claim 12, wherein the sensed contact pressure is an indication of contact made between the end of the stylus and touch screen panel.

20. The system of claim 12, wherein the sensed contact pressure is a value indicative of an applied pressure from contact made between the end of the stylus and touch screen panel.

21. The system of claim 11, wherein the pressure sensor comprises a silicon pressure sensor.

22. The system of claim 21, wherein the silicon pressure sensor is of the MEMS-type.

23. The system of claim 10, wherein the touch screen panel is of a capacitive touch screen type.

24. A method, comprising:
applying a drive signal to a plurality of drive lines of a touch screen panel;
sensing a touch of the touch screen panel made by a stylus, using a plurality of sense lines of the touch screen panel;
initiating emission of an RF signal in response to said sensed touch made to the touch screen panel, the RF signal being emitted independently of the plurality of drive lines and the plurality of sense lines;
enabling sensing of contact pressure at the stylus in response to receipt of the emitted RF signal; and
communicating the sensed stylus contact pressure to said touch screen system.

25. The method of claim 24, wherein communicating comprises wirelessly transmitting the sensed stylus contact pressure to a touch screen system including said touch screen panel.

26. The method of claim 24, further comprising confirming by a touch screen system including said touch screen panel the sensed actual touch if the sensed stylus contact pressure is communicated from the stylus.

27. The method of claim 24, wherein the touch screen panel is of a capacitive touch screen type.

* * * * *